(12) United States Patent
Bok et al.

(10) Patent No.: US 6,776,327 B2
(45) Date of Patent: Aug. 17, 2004

(54) HIGH-ACCURACY PLACEMENT METHOD UTILIZING DOUBLE PICK AND PLACE

(75) Inventors: Zeger Bok, San Diego, CA (US); John Brajkovich, Temecula, CA (US); Jay L. Smith, II, Carlsbad, CA (US)

(73) Assignee: Palomar Technologies, Inc., Vista, CA (US)

( * ) Notice: Subject to any disclaimer, the term of this patent is extended or adjusted under 35 U.S.C. 154(b) by 115 days.

(21) Appl. No.: 10/288,208

(22) Filed: Nov. 5, 2002

(65) Prior Publication Data

US 2004/0084507 A1 May 6, 2004

(51) Int. Cl.[7] .............................................. B23K 31/02
(52) U.S. Cl. ...................... 228/102; 228/49.5; 228/103; 228/232
(58) Field of Search ................................ 228/102, 103, 228/49.1, 49.5, 47.1, 8, 9, 232

(56) References Cited

U.S. PATENT DOCUMENTS

| 3,958,740 | A | * | 5/1976 | Dixon | 228/102 |
|---|---|---|---|---|---|
| 4,200,393 | A | * | 4/1980 | Suzuki et al. | 356/73 |
| 4,203,132 | A | * | 5/1980 | Schmitt et al. | 348/87 |
| 4,342,090 | A | * | 7/1982 | Caccoma et al. | 716/8 |
| 5,062,565 | A | * | 11/1991 | Wood et al. | 228/9 |
| 5,113,565 | A | * | 5/1992 | Cipolla et al. | 29/25.01 |
| 5,347,700 | A | * | 9/1994 | Tominaga et al. | 29/430 |
| 5,351,872 | A | * | 10/1994 | Kobayashi | 228/6.2 |
| 5,368,217 | A | * | 11/1994 | Simmons et al. | 228/6.2 |
| 6,193,132 | B1 | * | 2/2001 | Shibata et al. | 228/103 |
| 6,481,614 | B2 | * | 11/2002 | Mannhart et al. | 228/9 |
| 6,538,244 | B1 | * | 3/2003 | Skunes | 250/208.1 |
| 6,669,076 | B2 | * | 12/2003 | Nogawa | 228/4.5 |
| 2002/0014515 | A1 | * | 2/2002 | Koduri | 228/105 |

* cited by examiner

Primary Examiner—Kiley Stoner
(74) Attorney, Agent, or Firm—Rodney F. Brown

(57) ABSTRACT

A method is provided for placement of a first workpiece onto a second workpiece. The first workpiece is initially positioned at an origination location and the second workpiece has an attach location different from the origination location. A first place step is performed to displace the first workpiece from the origination location to an intermediate location different from the origination and attach locations. A second place step is performed to displace the first workpiece from the intermediate location to the attach location and the first workpiece is attached to the second workpiece at the attach location.

48 Claims, 3 Drawing Sheets

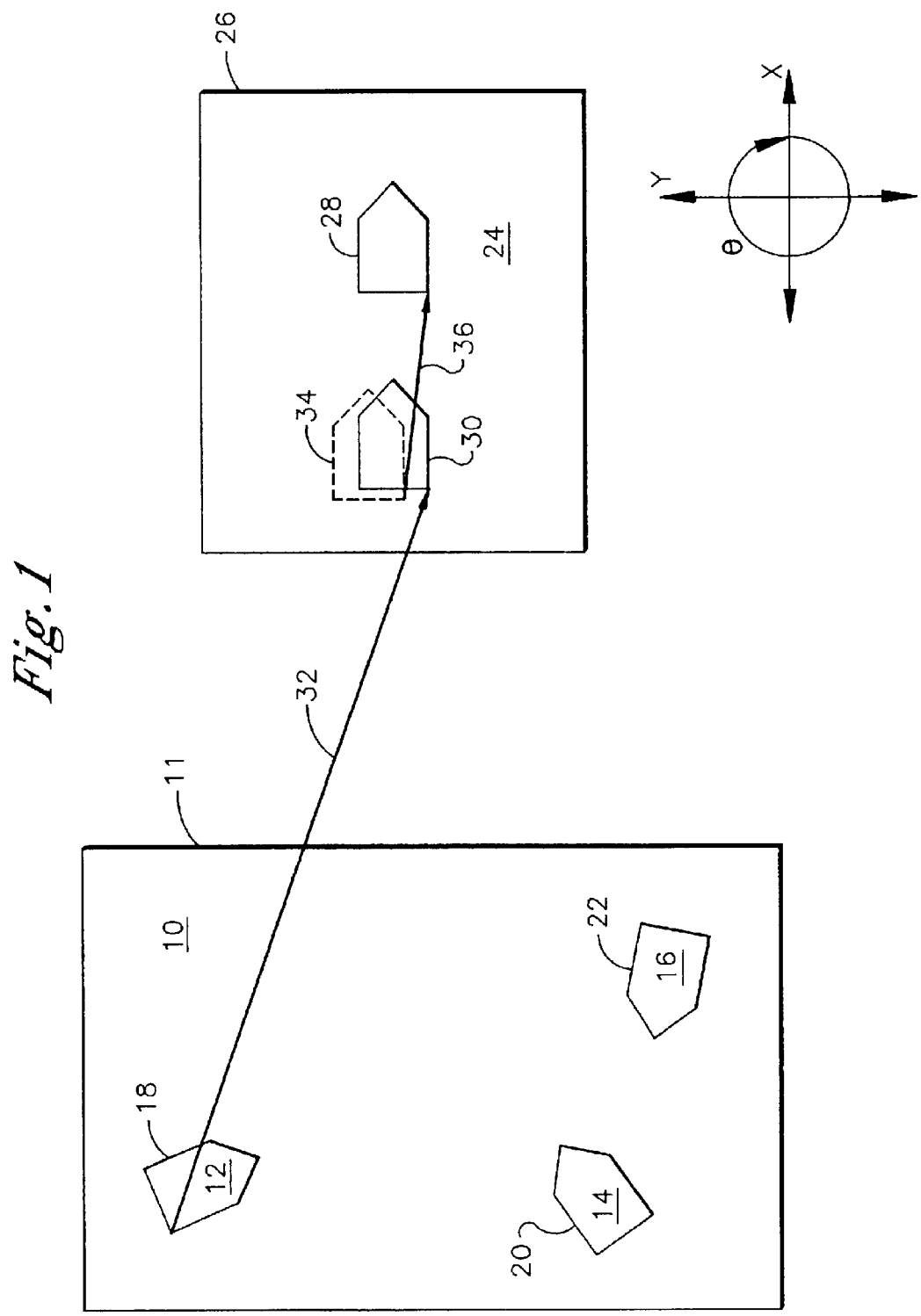

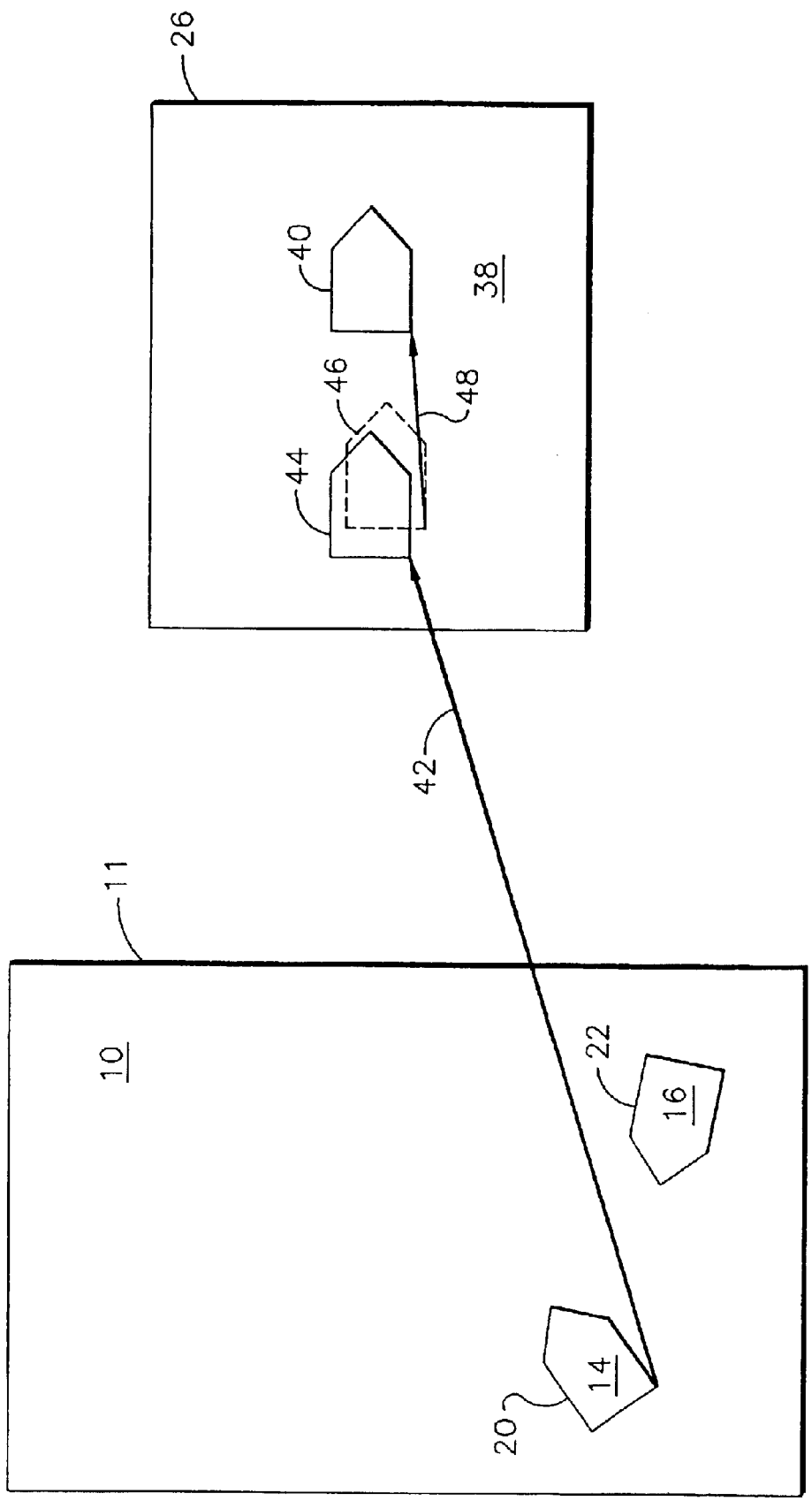

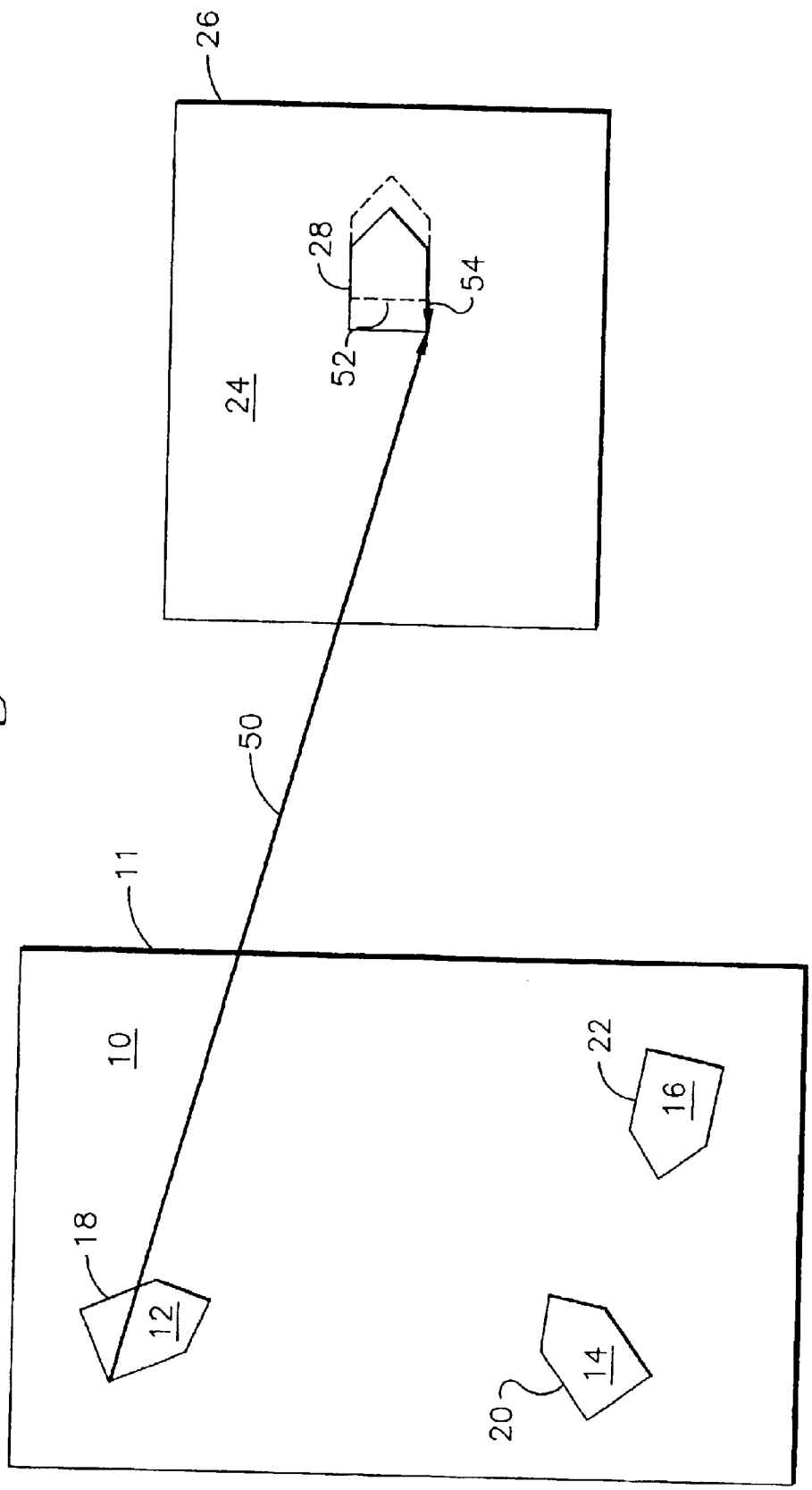

HIGH-ACCURACY PLACEMENT METHOD UTILIZING DOUBLE PICK AND PLACE

TECHNICAL FIELD

The present invention relates generally to a method for high accuracy placement of a first workpiece onto a second workpiece for attachment of the two workpieces, and more particularly to a high accuracy placement method which utilizes double pick and place of the first workpiece to enhance the final placement accuracy of the first workpiece onto the second workpiece.

BACKGROUND OF THE INVENTION

Many applications in the electronics industry require attachment of electronic components to one another. Die attach is an attachment method which has particular utility to the microelectronics industry. The basic principles of soldering apply to die attach, but die attach is specific to attachment of a die to a circuit body. The die is typically a tiny semiconductor device such as a diode or transistor and the circuit body is typically a larger structure such as a substrate or a package on which the die is mounted. Attachment of the die to the circuit body is preceded by a pick and place operation, wherein the die is picked from a remote location by a tool and placed on the circuit body at the location where attachment is desired. Thereafter, the die and circuit body are heated to the melting point of an interposed solder, more specifically termed the die attach material, to form an electrically and thermally conductive die attach connection between the die and the circuit body.

It is generally desirable to automate die attach, including the pick and place operation, to achieve the high output rates required for most industrial applications. For example, the optical communications industry requires large volumes of laser diodes attached to packages or substrates by die attach. Nevertheless, such applications also have very narrow placement tolerances with respect to placement of the die on the package or substrate for satisfactory performance of the resulting product, e.g., on the order of 1 to 5 microns. Conventional machines are not able to perform pick and place operations in a sufficiently accurate manner to achieve the required placement tolerances of most optical communications applications. As such, the present invention both recognizes and solves the need for an automated placement method, which is sufficiently accurate for the most demanding microelectronic applications.

Accordingly, it is an object of the present invention to provide an automated placement method which is both time efficient and highly accurate. More particularly, it is an object of the present invention to provide an automated placement method which processes a workpiece pair by placing the first workpiece onto the second workpiece with a high degree of accuracy and precision and thereafter attaching the first workpiece to the second workpiece. These objects and others are accomplished in accordance with the invention described hereafter.

SUMMARY OF THE INVENTION

The present invention is a method for placement of a first workpiece onto a second workpiece. The first workpiece is initially positioned at an origination location and the second workpiece has an attach location different from the origination location. A first place step is performed to displace the first workpiece from the origination location to an intermediate location different from the origination and attach locations. A second place step is performed to displace the first workpiece from the intermediate location to the attach location and the first workpiece is attached to the second workpiece at the attach location.

In accordance with a more specific embodiment, the present invention is a method for placement of a first workpiece, which is preferably a die, onto a second workpiece, which is preferably a circuit body. The first workpiece is initially positioned at an origination location which is different from a target intermediate location. The second workpiece is positioned at a work location and has a target attach location which is different from the target intermediate location and the origination location. A first place step is performed to displace the first workpiece from the origination location to an actual intermediate location. Displacement of the first workpiece from the origination location to the actual intermediate location is preferably performed with reference to a first place path determined by referencing the target intermediate location. A first pick step is preferably performed in advance of the first place step by engaging the first workpiece with a pickup tool at the origination location. Displacement of the first workpiece in the first place step is effected by displacing the pickup tool while engaging the first workpiece. The pickup tool is then preferably disengaged from the first workpiece at the actual intermediate location. The actual intermediate location is different from the origination location and is identical to the target intermediate location or differs from the target intermediate location by an intermediate error deviation. The intermediate error deviation is preferably between about 0 and 5 degrees with respect to a rotational reference axis or between about 0 and 15 microns with respect to linear reference axes.

A second place step is performed to displace the first workpiece from the actual intermediate location to an actual attach location on the second workpiece. Displacement of the first workpiece from the actual intermediate location to the actual attach location is preferably performed with reference to a second place path determined by referencing the target attach location. A second pick step is preferably performed in advance of the second place step by reengaging the first workpiece with the pickup tool at the actual intermediate location and displacing the first workpiece in the second place step by displacement of the pickup tool while engaging the first workpiece. The actual attach location is different from the origination location and the target intermediate location and is identical to the target attach location or differs from the target attach location by an attach error deviation. The attach error deviation is preferably between about 0 and 2 degrees with respect to a rotational reference axis or between about 0 and 10 microns with respect to linear reference axes and the attach error deviation is more preferably less than the intermediate error deviation.

The first workpiece is then attached to the actual attach location. In accordance with one alternative, the first workpiece is thermally attached to the actual attach location by heating the first or second workpiece or both first and second workpieces to a thermal attachment temperature sufficient to effect thermal attachment of the first workpiece to the actual attach location. The first workpiece may be preheated before the second place step to a background temperature less than the thermal attachment temperature. Soldering is a preferred thermal attachment means.

The method of the present invention is preferably performed repetitively in successive cycles on succeeding first and second workpiece pairs. As such, the first cycle has been described above, wherein the first workpiece is a first pair first workpiece of the first workpiece pair and the second workpiece is a first pair second workpiece of the first workpiece pair. The origination location is a first pair origination location and the target attach location is a first pair target attach location. A second cycle is initiated by displacing the first pair second workpiece from the work location. The second workpiece pair consists of a second pair first workpiece and a second pair second workpiece. The second pair first workpiece is positioned at a second pair origination location different from the target intermediate location and the first pair origination location. The first and second pair origination locations are preferably on a carrier. The second pair second workpiece has a second pair target attach location and is positioned at the work location such that the second pair target attach location corresponds identically to the first pair target attach location when the first pair second workpiece was positioned at the work location.

A second pair first place step is performed to displace the second pair first workpiece from the second pair origination location to a second pair actual intermediate location. The second pair actual intermediate location is different from the second pair origination location and is identical to the target intermediate location or differs from the target intermediate location by a second pair intermediate error deviation. A second pair second place step is performed to displace the second pair first workpiece from the second pair actual intermediate location to a second pair actual attach location on the second pair second workpiece. The second pair actual attach location is different from the second pair origination location and the target intermediate location and is identical to the second pair target attach location or differs from the second pair target attach location by a second pair attach error deviation. The second pair first workpiece is attached to the second pair actual attach location following the second pair second place step.

Another method of performing the present invention repetitively in successive cycles on succeeding first and second workpiece pairs is provided in the alternative. The first cycle remains as described above. However, the second cycle differs from the second cycle described above insofar as the second workpiece of the first workpiece pair is also the second workpiece of the second workpiece pair. The second workpiece pair further consists of a second pair first workpiece, which is distinct from the first pair first workpiece. The second pair first workpiece is positioned at a second pair origination location different from the target intermediate location and the first pair origination location. The second workpiece has a second pair target attach location different from the first pair target attach location. A second pair first place step is performed to displace the second pair first workpiece from the second pair origination location to a second pair actual intermediate location. The second pair actual intermediate location is different from the second pair origination location and is identical to the target intermediate location or differs from the target intermediate location by a second pair intermediate error deviation.

A second pair second place step is performed to displace the second pair first workpiece from the second pair actual intermediate location to a second pair actual attach location on the second workpiece. The second pair actual attach location is different from the second pair origination location, the target intermediate location, and the first pair target and actual attach locations and is identical to the second pair target attach location or differs from the second pair target attach location by a second pair attach error deviation. The second pair first workpiece is attached to the second pair actual attach location following the second pair second place step.

Another method of performing a single cycle of the present invention is further provided in the alternative. The present embodiment of the first cycle differs from the embodiment of the first cycle described above only insofar as the target intermediate location is identical to the target attach location of the second workpiece. Yet another alternative for performing the present invention repetitively in successive cycles on succeeding first and second workpiece pairs is provided wherein the second pair second workpiece is distinct from the second pair second workpiece. This alternative differs from those recited above only insofar as the target intermediate location is identical to both the first pair and second pair target attach locations of the first pair and second pair second workpieces, respectively. Still another alternative for performing the present invention repetitively in successive cycles on succeeding first and second workpiece pairs is provided wherein the second workpiece of the first and second workpiece pairs are the same workpiece. This alternative differs from those recited above insofar as the target intermediate location is a first pair target intermediate location, which is identical to the first pair target attach location of the second workpiece. The second workpiece also has a second pair target attach location which is identical to a second pair target intermediate location.

The present invention will be further understood from the drawings and the following detailed description.

BRIEF DESCRIPTION OF THE DRAWINGS

FIG. 1 is a conceptualized view of a first cycle of the placement method of the present invention, wherein a first workpiece pair undergoes double pick and place.

FIG. 2 is a conceptualized view of a second cycle of the placement method, wherein a second workpiece pair undergoes double pick and place.

FIG. 3 is a conceptualized view of a first cycle of an alternate embodiment of the placement method of the present invention, wherein a workpiece first pair undergoes double pick and place.

DESCRIPTION OF PREFERRED EMBODIMENTS

Referring to the FIG. 1, a carrier 10 is shown at a support location 11. The carrier 10 has a plurality of parts termed workpieces 12, 14, 16, which are positioned on the carrier 10. Each workpiece 12, 14, 16 originates from a distinct and different location on the carrier 10, which is termed an origination location 18, 20, 22, respectively. The support location 11 and each origination location 18, 20, 22 are specified by a unique set of reference coordinates, which reference linear axes x and y and a rotational axis θ. The x and y axes are oriented perpendicular to one another and the rotational axis θ is rotationally oriented about the origin of the x and y axes. The x, y and θ axes are all coplanar, residing within a horizontal plane. It is understood that the particular origination locations 18, 20, 22 shown in FIG. 1 have been arbitrarily selected for purposes of illustration. Any number of origination locations are possible within the scope of the present invention. In practice, the actual origination location of the workpiece is usually the result of the specific carrier configuration and/or the workpiece 12, 14, 16 configurations.

Another part, termed a workpiece 24, is positioned at a work location 26, which is apart from the origination locations 18, 20, 22 of the workpieces 12, 14, 16. The work location 26 may likewise be specified by a unique set of reference coordinates on the x, y, and θ axes. The workpieces 12, 14, 16 are more specifically termed displaceable workpieces insofar as the location of the workpiece 12 changes from its origination location 18 during practice of a first cycle of the present placement method described hereafter. The location of the workpiece 14 similarly changes from its origination location 20 during practice of a second cycle of the present placement method and the location of the workpiece 16 changes from its origination location 22 during practice of a third cycle. In contrast, the workpiece 24 is more specifically termed a stationary workpiece insofar as the location of the workpiece 24 preferably, although not necessarily, remains essentially fixed at the work location 26 for at least the duration of the first cycle. The stationary workpiece 24 and the carrier 10, which initially includes the displaceable workpieces 12, 14, 16, are commonly supported by a work surface (not shown), such as a table top, which is preferably planar and horizontally oriented.

The displaceable workpieces 12, 14, 16 are each preferably more particularly characterized as a die. A die is typically a tiny semiconductor device, for example, a diode (such as a laser diode), a capacitor, or a transistor. The stationary workpiece 24 is more particularly preferably characterized as a circuit body. A circuit body is broadly defined herein as any structure to which a die is conventionally attached for purposes of assembling a circuit. As such, the circuit body is typically larger than the die and often has a planar structure. For example, the circuit body may be a substrate which supports a printed circuit or integrated circuit package or the circuit body may be the printed circuit or integrated circuit package itself. As broadly defined herein, the carrier 10 is any conventional support structure for a displaceable workpiece prior to assembly of the displaceable workpiece into a finished product. Thus, for example, the carrier may be a structure for supporting a die prior to attachment of the die to a circuit body. The carrier may be a separate structure, on which the die is mounted, or the carrier and the die supported thereby may be an integrated unitary structure. In any case, the carrier 10 functions as a holder for a displaceable workpiece, and more typically for a plurality of displaceable workpieces, during transport, storage and/or handling of the displaceable workpiece up to the time of displacing the displaceable workpiece from the carrier. Exemplary carriers include wafers, waffle packs, gel packs, and the like.

As recited above, it is an object of the placement method of the present invention to process a workpiece pair by placing the first workpiece of the pair onto the second workpiece of the pair with a high degree of accuracy and precision and thereafter to attach the first workpiece to the second workpiece. Practice of the placement method may be summarized as comprising a series of first pick and place steps, a series of second pick and place steps. The placement method may further comprise an attachment method. In the first series of pick and place steps, the first workpiece is picked in a first pick step from its origination location and placed in a first place step at an intermediate location. In the second series of pick and place steps, the first workpiece is picked from the intermediate location in a second pick step and placed at an attach location on the second workpiece in a second place step. The second workpiece may then be attached to the first workpiece at the attach location in accordance with the attachment method. The placement method summarized above encompasses alternate specific embodiments. In one embodiment, a target intermediate location is predetermined and fixed at a location which is different from the attach location. In an alternate embodiment, a target intermediate location is predetermined and fixed at a location which is essentially identical to the attach location.

The first embodiment of the placement method is described hereafter in greater detail with continuing reference to FIG. 1. A first workpiece of a first workpiece pair is selected which is preferably the displaceable workpiece 12 and is more preferably a die. As noted above, the displaceable workpiece 12 is positioned at the origination location 18 on the carrier 10. A second workpiece of the first workpiece pair is selected which is preferably the stationary workpiece 24 and is more preferably a circuit body. As noted above, the stationary workpiece 24 is positioned at the work location 26, preferably apart from the carrier 10. A target attach location 28 is predetermined by the practitioner on the surface of the stationary workpiece 24 and is specified by a set of reference coordinates on the x, y, and θ axes. The target attach location 28 is the precise areal site on the stationary workpiece 24 where it is desired to accurately place and subsequently attach the displaceable workpiece 12 to the stationary workpiece 24. The target attach location 28 may have an attachment medium such as an adhesive (e.g., an epoxy), a solder preform or a solder predeposit, which is predisposed thereon for subsequent attachment of the displaceable workpiece 12 to the target attach location 28 in a manner described below. A target intermediate location 30 is also predetermined by the practitioner. The target intermediate location 30 is specified by a set of reference coordinates on the x, y, and θ axes which differ from the set of reference coordinates specifying the target attach location 28 as well as the sets of reference coordinates specifying the origination locations 18, 20, 22.

Whereas the unique set of reference coordinates for each origination location 18, 20, 22 can vary considerably from the set of reference coordinates for the target attach location 28 with respect to all three axes x, y, and θ, there is greater correspondence between the set of reference coordinates for the target attach location 28 and the set of reference coordinates for the target intermediate location 30. In particular, the θ coordinates for the target intermediate location 30 and the target attach location 28 are preferably identical. The target intermediate location 30 and the target attach location 28 preferably differ from one another only with respect to the x coordinates and the y coordinates, and more preferably only with respect to the x coordinates or the y coordinates. As such, the target intermediate location 30 and the target attach location 28 are preferably separated by a distance corresponding to the difference between the x coordinates or the y coordinates or the differences between both the x coordinates and the y coordinates. In any case, the target intermediate location 30 is often nearer the target attach location 28 than the origination locations 18, 20, 22 are to the target attach location 28. Thus, the distance between the target intermediate location 30 and the target attach location 28, termed the second place distance, is typically small relative to the distances between each of the origination locations 18, 20, 22 and the target attach location 28, termed the first place distances. In some cases, the target intermediate location 30 is desirably positioned directly on the stationary workpiece 24 immediately adjacent to the target attach location 28 as shown in FIG. 1. However, it is within the scope of the present invention to alternatively position the target intermediate location apart from the stationary workpiece.

The set of reference coordinates specifying each origination location 18, 20, 22, work location 26, target attach location 28 and target intermediate location 30 may also reference a z axis (not shown) in addition to the x, y and θ axes. The z axis is a linear axis which is oriented perpendicular to both the x and y axes and resides within a vertical plane. However, specification of the z coordinate with respect to the origination, work, attach, and intermediate locations 18, 20, 22, 26, 28, 30 is omitted from the present description in the interest of simplicity. Nevertheless, it is noted that the z coordinate (i.e., the height) is often constant for all or many of the locations 18, 20, 22, 26, 28, 30.

The present embodiment of the placement method proceeds by visually referencing the displaceable workpiece 12 at the origination location 18 using a conventional machine vision apparatus (not shown) to establish its precise reference coordinates at the origination location 18 with respect to the x, y and θ axes. The target intermediate location 30 may also be visually referenced in substantially the same manner to confirm the precise reference coordinates of the target intermediate location 30. However, visual referencing of the target intermediate location 30 is optional insofar as the reference coordinates of the target intermediate location 30 are already known, having been predetermined by the practitioner. The reference coordinates of the origination location 18 and the target intermediate location 30 are used to determine a first place path 32 for precision travel of the pickup tool, and correspondingly the displaceable workpiece 12, from the origination location 18 to the target intermediate location 30.

A first pick step is performed by engaging the displaceable workpiece 12 with a conventional pickup tool (not shown), such as a die collet, which is directed to the displaceable workpiece 12 using the reference coordinates of the origination location 18. The pickup tool is capable of motion in the x, y, z and θ axes. The pickup tool is further capable of maintaining engagement with the displaceable workpiece 12 during motion of the pickup tool such that the displaceable workpiece 12 moves in correspondence with the pickup tool. Engagement of the pickup tool with the displaceable workpiece 12 during motion of the pickup tool is maintained by conventional means such as vacuum suction or the like.

A first place step is performed by displacing the pickup tool and displaceable workpiece 12 with reference to the first place path 32. In particular, the workpiece 12 is displaced from the origination location 18 to an actual intermediate location 34 and placed on the actual intermediate location 34. The actual intermediate location 34 is desirably identical to the target intermediate location 30. However, in practice, there is often a small degree of difference between the target intermediate location 30 and the actual intermediate location 34 due to an intermediate error deviation from the first place path 32. The intermediate error deviation from the first place path 32 may be expressed as the linear distance between the center of the target intermediate location 30 and the center of the actual intermediate location 34 in the x-y plane with reference to the x and y axes and is preferably between about 0 and 15 microns. The intermediate error deviation from the first place path 32 may also or alternatively be expressed as the difference between the angular orientation of the target intermediate location 30 and the angular orientation of the actual intermediate location 34 in the x-y plane with reference to the θ axis and is preferably between about 0 and 5 degrees. The actual intermediate location 34 is represented in FIG. 1 by dashed lines, which are offset from the target intermediate location 30 to depict the intermediate error deviation. It is understood that this is merely an exemplary conceptual representation of the intermediate error deviation and that the intermediate error deviation may alternatively be negligible or nonexistent. Once the workpiece 12 is placed at the actual intermediate location 34, the pickup tool disengages from the workpiece 12 permitting the workpiece 12 to rest in a static condition at the actual intermediate location 34. Disengagement may be effected, for example, by releasing the vacuum suction from the workpiece 12. It is noted that the target and actual intermediate locations 30, 34 are preferably substantially free of any attachment media, such as adhesives or solder, which could adversely impact the first and second series of pick and place steps.

The target attach location 28 is visually referenced to confirm the precise reference coordinates of the target attach location 28 with respect to the x, y and θ axes. The displaceable workpiece 12 is also visually referenced after the first place step to determine its precise reference coordinates at the actual intermediate location 34. Any difference between the reference coordinates of the actual intermediate location 34 and the target intermediate location 30 is in direct correspondence with the magnitude of the intermediate error deviation. The reference coordinates of the target attach location 28 and of the displaceable workpiece 12 at the actual intermediate location 34 are used to determine a second place path 36 for precision travel of the pickup tool, and correspondingly the displaceable workpiece 12, from the actual intermediate location 34 to the target attach location 28. The second place path 36 corrects for the intermediate error deviation, if any, to negate the effect of the intermediate error deviation in a second place step described below.

A second pick step is performed by reengaging the pickup tool with the workpiece 12 at the actual intermediate location 34 using the reference coordinates of the workpiece 12 at the actual intermediate location 34. The second place step is performed by displacing the pickup tool and workpiece 12 with reference to the second place path 36. In particular, the workpiece 12 is displaced from the actual intermediate location 34 to an actual attach location and placed on the actual attach location. In practice, any attach error deviation from the second place path 36 is either nonexistent or within the extremely narrow placement tolerances of attach methods, to which the present placement method is applicable. Thus, the actual attach location where the workpiece 12 is placed at the conclusion of the second place step is designated by the same reference character 28 in FIG. 1 as the target attach location. The attach error deviation from the second place path 36 is expressed, similar to the intermediate error deviation, as the linear distance between the center of an actual attach location and the target attach location 28 in the x-y plane with reference to the x and y axes and is preferably about 0 to 10 microns, more preferably about 0 to 5 microns, and most preferably about 0 to 1 micron. The attach error deviation from the second place path 36 is also or alternatively expressed as the difference between the angular orientation of the actual attach location and the angular orientation of the target attach location 28 in the x-y plane with reference to the θ axis and is preferably about 0 to 2 degrees, more preferably about 0 to 1 degree, and most preferably about 0 to 0.5 degrees. In practice, the actual error deviation is typically substantially less than the intermediate error deviation.

After the pickup tool places the workpiece 12 at the actual attach location, the pickup tool preferably remains in engagement with the workpiece 12 at least until substantially permanent attachment of the workpiece 12 to the workpiece 24 at the actual attach location is initiated and may remain in engagement with the workpiece 12 until attachment is completed. Attachment of the workpiece 12 to the workpiece 24 at the actual attach location is effected by any attachment method within the purview of the skilled artisan. Attachment methods having specific utility to the present placement method may comprise one or more attachment steps and may be selected from non-thermal and thermal methods, including soldering (particularly die attach) or adhesion using a thermal or non-thermal adhesive. Thermal attachment is effected employing one or more heating techniques, such as laser pulse heating, resistance heating (using, for example, a hotbar), or induction heating (particularly RF or microwave heating).

In accordance with a preferred thermal attachment method, a primary attachment step is provided, wherein primary heat is directly or indirectly applied to the interface of the workpieces 12, 24 at the actual attach location while the pickup tool retains the workpiece 12 in place at the actual attach location. The primary heat heats the interface to a thermal attachment temperature, which is sufficient to create a thermal bond between the workpiece 12 and the workpiece 24 at the actual attach location. When a thermal attachment medium such as a solder or a thermal adhesive is employed, the thermal attachment temperature is greater than or equal to the activation temperature of the thermal attachment medium, e.g., at or above a solder melting point. Exemplary thermal attachment temperatures are typically in a range from about 150 to 450° C.

The thermal attachment method may also include a preliminary attachment step to preheat the workpiece 12 in advance of the primary attachment step, preferably after completion of the first place step and before completion of the second place step (e.g., while the workpiece 12 is being displaced to the actual attach location), and more preferably after completion of the first place step and before initiation of the second pick step (e.g., while the workpiece 12 is residing at the actual intermediate location 34 which is substantially free of a thermal attachment medium). The preliminary attachment step may be inherently (i.e., passively) performed by placement of the workpiece 12 at the actual intermediate location 34 which is at a background temperature greater than the temperature of the workpiece 12. Heat transfer from the higher temperature actual intermediate location 34 preheats the workpiece 12 to the background temperature while the workpiece 12 resides at the actual intermediate location 24. The background temperature is preferably insufficient to effect thermal attachment of the workpiece 12 to the workpiece 24. Thus, when a thermal attachment medium such as a solder or a thermal adhesive is employed, the background temperature is preferably less than the activation temperature of the attachment medium, e.g., below the solder melting point. The background temperature is typically in a range from about 100 to 300° C. The second series of pick and place steps are preferably performed before the workpiece 12 undergoes any substantial cooling from the background temperature.

In sum, the thermal attachment method optionally begins with a preliminary attachment step, wherein the workpiece 12 is preheated to the background temperature at a location apart from the actual attach location. The preheated workpiece 12 is then placed on the actual attach location in the second place step and the interface of the two workpieces 12, 24 is ramp heated in the primary attachment step to the thermal attachment temperature. The interface is maintained at the thermal attachment temperature for a sufficient attach time to effect attachment (i.e., thermal bonding) of the workpieces 12, 24. Finally the interface is cooled down from the thermal attachment temperature upon completion of the attach time.

It is further within the scope of the present invention to include a secondary attachment step in the present thermal attachment method when a thermal adhesive is employed. The secondary attachment step is performed sequentially after the primary attachment step and is designed to thermally cure the thermal adhesive which forms the thermal bond between the two workpieces 12, 24 by applying secondary heat directly or indirectly to the thermal bond. The secondary attachment step is preferably performed off-line, i.e., after the thermal bond is cooled and/or the two workpieces 12, 24 have been removed from the work location 26. The secondary attachment step may have the same thermal profile as the primary attachment step and both the primary and secondary attachment steps are preferably performed relatively rapidly, i.e., in a matter of seconds.

An alternate to the above-recited thermal attachment method is a UV adhesive attachment method which employs a conventional UV adhesive. A primary attachment step is performed by exposing the UV adhesive to UV energy rather than to the above-recited thermal profile. The UV energy causes the adhesive to form a relatively weak bond between the two workpieces 12, 24 which is subsequently strengthened by thermal curing during a secondary attachment step. The secondary attachment step is preferably performed off-line in substantially the same manner as described above with respect to the thermal attachment method.

Placement and attachment of the first workpiece pair 12, 24 constitutes the first cycle of the present placement method. Upon completion of the first cycle, the stationary workpiece 24, having the displaceable workpiece 12 attached thereto, is removed from the work location 26. The second cycle of the present placement method may then be performed on a second workpiece pair 14, 38. With reference to FIG. 2, the carrier 10 is retained at the support location 11 and supports the displaceable workpiece 14 at the origination location 20. The displaceable workpiece 14 may, although not necessarily, have an identical structure to the displaceable workpiece 12. For example, both displaceable workpieces 12, 14 may be laser diodes supported on the common carrier 10. The workpiece 38 is a stationary workpiece preferably having an identical structure to the stationary workpiece 24 and preferably having a target attach location 40 on its surface which has identical reference coordinates to the target attach location 28 of the stationary workpiece 24 shown in FIG. 1 when the workpiece 38 is positioned at the work location 26.

The second cycle is performed in substantially the same manner as described above with respect to the first cycle. A first place path 42 is determined with reference to the origination location 20 and a target intermediate location 44 which has identical reference coordinates to the target intermediate location 30 shown in FIG. 1. The first pick step is performed by engaging the displaceable workpiece 14 with the pickup tool at the origination location 20. The first place step is then performed by displacing the pickup tool and displaceable workpiece 14 with reference to the first place path 42 from the origination location 20 to an actual intermediate location 46 and placing the workpiece 14 on the actual intermediate location 46. The actual intermediate location 46 differs from the target intermediate location 44, if at all, within the same range of intermediate error deviation recited above. The pickup tool disengages from the workpiece 14.

A second place path 48 is determined with reference to the actual intermediate location 46 and the target attach location 40, correcting for the intermediate error deviation, if any. The second pick step is performed by reengaging the pickup tool with the workpiece 14 at the actual intermediate location 46. The second place step is then performed by displacing the pickup tool and workpiece 14, with reference to the second place path 36, from the actual intermediate location 46 to an actual attach location and placing the workpiece 14 on the actual attach location, which is shown in FIG. 2 as being identical to the target attach location and is designated by the same reference character 40. The range of attach error deviation is the same as recited above. The workpiece 14 is then substantially permanently attached to the workpiece 38 at the actual attach location in a manner described above with respect to the first workpiece pair 12, 24. Any number of additional cycles may be performed repetitively and sequentially thereafter to process any number of additional pairs of displaceable and stationary workpieces.

Successive cycles of the placement method have been described above, wherein both the displaceable and stationary workpieces of a succeeding pair are each different from the displaceable and stationary workpieces of a preceding pair. As such, each displaceable workpiece is placed on and attached to a stationary workpiece of a succeeding pair, which is different than the stationary workpiece of the preceding pair. However, it is apparent to the skilled artisan that successive cycles of the placement method can be performed repetitively and sequentially, wherein the displaceable workpiece changes with each successive cycle, but the stationary workpiece does not necessarily change with each successive cycle. As such, two or more different displaceable workpieces can be sequentially placed on and attached to the same stationary workpiece, but with reference to different target attach locations on the stationary workpiece, to complete two or more successive cycles of the placement method. This embodiment is contemplated by and falls within the scope of the present invention.

An alternate embodiment of the present placement method is described hereafter with reference to FIG. 3, wherein elements common to FIG. 1 are designated by the same reference characters. The method of the present embodiment is essentially the same as the method of the first embodiment described above except that the target intermediate location and the target attach location of the present embodiment are identical. In accordance with the present embodiment, the carrier 10 is positioned at the support location 11 and supports the displaceable workpiece 12 at the origination location 18. The stationary workpiece 24 having the target attach location 28 is positioned at the work location 26. A first place path 50 is determined with reference to the origination location 18 and the target intermediate location which, as noted above, is identical to the target attach location 28. The first pick step is performed by engaging the displaceable workpiece 12 with the pickup tool at the origination location 18. The first place step is then performed by displacing the pickup tool and displaceable workpiece 12 with reference to the first place path 50 from the origination location 18 to an actual intermediate location 52 and placed on the actual intermediate location 52. The actual intermediate location 52 differs from the target attach location 28, if at all, within the same range of intermediate error deviation recited above. The pickup tool then disengages from the workpiece 12.

A second place path 54 is determined with reference to the actual intermediate location 52 and target attach location 28, correcting for the intermediate error deviation, if any. The second pick step is performed by reengaging the pickup tool with the workpiece 12 at the actual intermediate location 52. The second place step is then performed by displacing the pickup tool and workpiece 12, with reference to the second place path 54, from the actual intermediate location 52 to an actual attach location and placing the workpiece 12 on the actual attach location, which is shown in FIG. 3 as being identical to the target attach location 24. The range of attach error deviation is the same as recited above. The workpiece 12 is then substantially permanently attached to the workpiece 24 at the actual attach location in a manner described above to complete a first cycle of the present placement method. Any number of additional cycles may be performed repetitively and sequentially thereafter to process any number of additional pairs of displaceable and stationary workpieces in accordance with the present embodiment.

As above, successive cycles of the above-recited embodiment can alternatively be performed repetitively and sequentially, wherein the displaceable workpiece changes with each successive cycle, but the stationary workpiece does not necessarily change with each successive cycle. As such, two or more different displaceable workpieces can be sequentially placed on and attached to the same stationary workpiece, but with reference to different target attach locations on the stationary workpiece, to complete two or more successive cycles of the placement method. This embodiment is contemplated by and falls within the scope of the present invention.

The present placement method, in each of its embodiments, is desirably performed rapidly to achieve manufacturing economies. Although the completion time for the placement method is in part dependent on the required travel distances of the pickup tool, the completion time is typically less than 1 minute and oftentimes substantially less than 1 minute down to a few seconds. A single pick and place placement method may be faster than the present double pick and place placement method due to fewer processing steps, but the enhanced accuracy of the present placement method compensates for the increased completion time. In any case, some of the time increase due to the added steps for double pick and place is recovered during the attachment method because preheating the displaceable workpiece before thermal bonding creates time savings. Importantly, however, preheating also minimizes undesirable thermal expansion or contraction of the displaceable workpiece which can diminish placement accuracy. Preheating also reduces the thermal shock on the displaceable workpiece and stationary workpiece during the attachment method which can damage the workpieces and impair their ultimate function.

The present method achieves superior accuracy and precision in placing a displaceable workpiece on a stationary workpiece which is attributable to performance of the first and second series of pick and place steps in sequence. Specifically, displacement of the displaceable workpiece from an arbitrary origination location to a substantially fixed and known intermediate location in the first series of pick and place steps produces a high degree of predictability and repeatability in the second series of pick and place steps which comprises displacement of the displaceable workpiece from the fixed intermediate location to a substantially fixed and known attach location on the stationary workpiece. It is the predictability and repeatability in the second series of pick and place steps which enhances the final placement accuracy of the displaceable workpiece, particularly when many cycles of the present placement method are performed in succession. Placement accuracy may also be enhanced if the second place distance of the second place step is small relative to the first place distance of the first place step because the probability of error deviation often increases with distance.

Process control for practicing the above-recited embodiments of the present invention is preferably performed by one or more computers to achieve the required degree of accuracy and precision. A computer having process control software effectively controls pick and place operation of the pickup tool and corresponding motion of the workpieces in response to instructions entered by the practitioner and data entered by the machine vision apparatus.

While the forgoing preferred embodiments of the invention have been described and shown, it is understood that alternatives and modifications, such as those suggested and others, may be made thereto and fall within the scope of the invention.

We claim:

1. A method for placement of a first workpiece onto a second workpiece comprising the steps of:
   a) providing a first workpiece positioned at an origination location different from a target intermediate location;
   b) providing a second workpiece positioned at a work location and having a target attach location different from said target intermediate location and said origination location;
   c) performing a first place step to displace said first workpiece from said origination location to an actual intermediate location, wherein said actual intermediate location is different from said origination location and is identical to said target intermediate location or differs from said target intermediate location by an intermediate error deviation; and
   d) performing a second place step to displace said first workpiece from said actual intermediate location to an actual attach location on said second workpiece, wherein said actual attach location is different from said origination location and said target intermediate location and is identical to said target attach location or differs from said target attach location by an attach error deviation.

2. The method of claim 1 further comprising attaching said first workpiece to said actual attach location.

3. The method of claim 1 wherein said first workpiece is displaced from said actual intermediate location to said actual attach location with reference to a second place path determined by referencing said target attach location.

4. The method of claim 1 wherein said first workpiece is displaced from said origination location to said actual intermediate location with reference to a first place path determined by referencing said target intermediate location.

5. The method of claim 1 further comprising performing a first pick step, in advance of said first place step wherein a pickup tool engages said first workpiece at said origination location.

6. The method of claim 5 wherein said first workpiece is displaced in said first place step by displacement of said pickup tool engaging said first workpiece.

7. The method of claim 5 further comprising disengaging said pickup tool from said first workpiece at said actual intermediate location.

8. The method of claim 1 further comprising performing a second pick step, in advance of said second place step wherein a pickup tool engages said first workpiece at said actual intermediate location.

9. The method of claim 8 wherein said first workpiece is displaced in said second place step by displacement of said pickup tool engaging said first workpiece.

10. The method of claim 5 wherein said first workpiece is displaced in said second place step by displacement of said pickup tool engaging said first workpiece.

11. The method of claim 1 wherein said attach error deviation is between about 0 and 2 degrees with respect to a rotational reference axis or between about 0 and 10 microns with respect to linear reference axes.

12. The method of claim 1 wherein said intermediate error deviation is between about 0 and 5 degrees with respect to a rotational reference axis or between about 0 and 15 microns with respect to linear reference axes.

13. The method of claim 1 wherein said intermediate error deviation is greater than said attach error deviation.

14. The placement method of claim 2 wherein said first workpiece is thermally attached to said actual attach location by heating said first or second workpiece or both first and second workpieces to a thermal attachment temperature sufficient to effect thermal attachment of said first workpiece to said actual attach location.

15. The placement method of claim 14 wherein said first workpiece is preheated before said second place step to a background temperature less than said thermal attachment temperature.

16. The placement method of claim 2 wherein said first workpiece is attached to said actual attach site location by soldering.

17. The placement method of claim 1 wherein said first workpiece is a die.

18. The placement method of claim 1 wherein said second workpiece is a circuit body.

19. The method of claim 1 wherein said first workpiece is a first pair first workpiece of a first workpiece pair, said origination location is a first pair origination location, said second workpiece is a first pair second workpiece of said first workpiece pair, and said target attach location is a first pair target attach location, said placement method further comprising:

displacing said first pair second workpiece from said work location;

providing a second workpiece pair consisting of a second pair first workpiece and a second pair second workpiece, wherein said second pair first workpiece is positioned at a second pair origination location different from said target intermediate location and said first pair origination location and said second pair second workpiece has a second pair target attach location;

positioning said second pair second workpiece at said work location such that said second pair target attach location corresponds identically to said first pair target attach location when said first pair second workpiece was positioned at said work location;

performing a second pair first place step to displace said second pair first workpiece from said second pair origination location to a second pair actual intermediate location, wherein said second pair actual intermediate location is different from said second pair origination location and is identical to said target intermediate location or differs from said target intermediate location by a second pair intermediate error deviation; and performing a second pair second place step to displace said second pair first workpiece from said second pair actual intermediate location to a second pair actual attach location on said second pair second workpiece, wherein said second pair actual attach location is different from said second pair origination location and said target intermediate location and is identical to said second pair target attach location or differs from said second pair target attach location by a second pair attach error deviation.

20. The method of claim 19 further comprising attaching said second pair first workpiece to said second pair actual attach location.

21. The method of claim 19 wherein said first and second pair origination locations are on a carrier.

22. The method of claim 1 wherein said first workpiece is a first pair first workpiece of a first workpiece pair, said origination location is a first pair origination location, said second workpiece is said second workpiece of said first workpiece pair, and said target attach location is a first pair target attach location, said placement method further comprising:
providing a second workpiece pair consisting of a second pair first workpiece and said second workpiece, wherein said second pair first workpiece is positioned at a second pair origination location different from said target intermediate location and said first pair origination location and said second workpiece has a second pair target attach location different from said first pair target attach location;
performing a second pair first place step to displace said second pair first workpiece from said second pair origination location to a second pair actual intermediate location, wherein said second pair actual intermediate location is different from said second pair origination location and is identical to said target intermediate location or differs from said target intermediate location by a second pair intermediate error deviation; and
performing a second pair second place step to displace said second pair first workpiece from said second pair actual intermediate location to a second pair actual attach location on said second workpiece, wherein said second pair actual attach location is different from said second pair origination location, said target intermediate location, and said first pair target and actual attach locations and is identical to said second pair target attach location or differs from said second pair target attach location by a second pair attach error deviation.

23. The method of claim 22 further comprising attaching said second pair first workpiece to said second pair actual attach location.

24. A method for placement of a first workpiece onto a second workpiece comprising the steps of:
a) providing a first workpiece positioned at an origination location different from a target intermediate location;
b) providing a second workpiece having a target attach location different from said origination location;
c) performing a first place step to displace said first workpiece from said origination location to an actual intermediate location, wherein said actual intermediate location is identical to said target intermediate location or differs from said target intermediate location by an intermediate error deviation; and
d) performing a second place step to displace said first workpiece from said actual intermediate location to an actual attach location, wherein said actual attach location is identical to said target attach location or differs from said target attach location by an attach error deviation.

25. The method of claim 24 wherein said target attach location is identical to said target intermediate location.

26. The method of claim 25 further comprising attaching said first workpiece to said actual attach location.

27. The method of claim 25 wherein said first workpiece is displaced from said actual intermediate location to said actual attach location with reference to a second place path determined by referencing said target attach location.

28. The method of claim 25 wherein said first workpiece is displaced from said origination location to said actual intermediate location with reference to a first place path determined by referencing said target intermediate location.

29. The method of claim 25 further comprising performing a first pick step, in advance of said first place step wherein a pickup tool engages said first workpiece at said origination location.

30. The method of claim 29 wherein said first workpiece is displaced in said first place step by displacement of said pickup tool engaging said first workpiece.

31. The method of claim 29 further comprising disengaging said pickup tool from said first workpiece at said actual intermediate location.

32. The method of claim 25 further comprising performing a second pick step, in advance of said second place step wherein a pickup tool engages said first workpiece at said actual intermediate location.

33. The method of claim 32 wherein said first workpiece is displaced in said second place step by displacement of said pickup tool engaging said first workpiece.

34. The method of claim 29 wherein said first workpiece is displaced in said second place step by displacement of said pickup tool engaging said first workpiece.

35. The method of claim 25 wherein said attach error deviation is between about 0 and 2 degrees with respect to a rotational reference axis or between about 0 and 10 microns with respect to linear reference axes.

36. The method of claim 25 wherein said intermediate error deviation is between about 0 and 5 degrees with respect to a rotational reference axis or between about 0 and 15 microns with respect to linear reference axes.

37. The method of claim 25 wherein said intermediate error deviation is greater than said attach error deviation.

38. The placement method of claim 27 wherein said first workpiece is thermally attached to said actual attach location by heating said first or second workpiece or both first and second workpieces to a thermal attachment temperature sufficient to effect thermal attachment of said first workpiece to said actual attach location.

39. The placement method of claim 38 wherein said first workpiece is preheated before said second place step to a background temperature less than said thermal attachment temperature.

40. The placement method of claim 27 wherein said first workpiece is attached to said actual attach site location by soldering.

41. The placement method of claim 25 wherein said first workpiece is a die.

42. The placement method of claim 25 wherein said second workpiece is a circuit body.

43. The method of claim 25 wherein said first workpiece is a first pair first workpiece of a first workpiece pair, said origination location is a first pair origination location, said second workpiece is a first pair second workpiece of said first workpiece pair, and said target attach location is a first pair target attach location, said placement method further comprising:
displacing said first pair second workpiece from said work location;
providing a second workpiece pair consisting of a second pair first workpiece and a second pair second workpiece, wherein said second pair first workpiece is positioned at a second pair origination location different from said target intermediate location and said first pair origination location and said second pair second workpiece has a second pair target attach location;

positioning said second pair second workpiece at said work location such that said second pair target attach location corresponds identically to said first pair target attach location and said target intermediate location when said first pair second workpiece was positioned at said work location;

performing a second pair first place step to displace said second pair first workpiece from said second pair origination location to a second pair actual intermediate location, wherein said second pair actual intermediate location is different from said second pair origination location and is identical to said target intermediate location or differs from said target intermediate location by a second pair intermediate error deviation; and performing a second pair second place step to displace said second pair first workpiece from said second pair actual intermediate location to a second pair actual attach location on said second pair second workpiece, wherein said second pair actual attach location is different from said second pair origination location and said target intermediate location and is identical to said second pair target attach location or differs from said second pair target attach location by a second pair attach error deviation.

44. The method of claim 43 further comprising attaching said second pair first workpiece to said second pair actual attach location.

45. The method of claim 43 wherein said first and second pair origination locations are on a carrier.

46. The method of claim 25 wherein said first workpiece is a first pair first workpiece of a first workpiece pair, said origination location is a first pair origination location, said second workpiece is said second workpiece of said first workpiece pair, said target intermediate location is a first pair target intermediate location, and said target attach location is a first pair target attach location, said placement method further comprising:

providing a second workpiece pair consisting of a second pair first workpiece and said second workpiece, wherein said second pair first workpiece is positioned at a second pair origination location different from a second pair target intermediate location and said first pair origination location and said second workpiece has a second pair target attach location different from said first pair target attach location and identical to said second pair target intermediate location;

performing a second pair first place step to displace said second pair first workpiece from said second pair origination location to a second pair actual intermediate location, wherein said second pair actual intermediate location is different from said second pair origination location and is identical to said second pair target intermediate location or differs from said second pair target intermediate location by a second pair intermediate error deviation; and performing a second pair second place step to displace said second pair first workpiece from said second pair actual intermediate location to a second pair actual attach location on said second workpiece, wherein said second pair actual attach location is different from said second pair origination location and said first pair target and actual attach locations and is identical to said second pair target attach location or differs from said second pair target attach location by a second pair attach error deviation.

47. The method of claim 46 further comprising attaching said second pair first workpiece to said second pair actual attach location.

48. A method for placement of a first workpiece onto a second workpiece comprising the steps of:

a) providing a first workpiece positioned at an origination location;

b) providing a second workpiece having an attach location different from said origination location;

c) performing a first place step to displace said first workpiece from said origination location to an intermediate location different from said origination location and said attach location;

d) performing a second place step to displace said first workpiece from said intermediate location to said attach location; and e) attaching said first workpiece to said second workpiece.

* * * * *